(12) United States Patent
Nagamine et al.

(10) Patent No.: US 11,047,052 B2
(45) Date of Patent: Jun. 29, 2021

(54) RESIN PLATING METHOD

(71) Applicant: OKUNO CHEMICAL INDUSTRIES CO., LTD., Osaka (JP)

(72) Inventors: Shingo Nagamine, Osaka (JP); Koji Kita, Osaka (JP); Kuniaki Otsuka, Osaka (JP)

(73) Assignee: OKUNO CHEMICAL INDUSTRIES CO., LTD., Osaka (JP)

( * ) Notice: Subject to any disclaimer, the term of this patent is extended or adjusted under 35 U.S.C. 154(b) by 0 days.

(21) Appl. No.: 15/324,461

(22) PCT Filed: Apr. 24, 2015

(86) PCT No.: PCT/JP2015/062485
§ 371 (c)(1),
(2) Date: Jan. 6, 2017

(87) PCT Pub. No.: WO2016/006301
PCT Pub. Date: Jan. 14, 2016

(65) Prior Publication Data
US 2017/0159183 A1   Jun. 8, 2017

(30) Foreign Application Priority Data
Jul. 10, 2014 (JP) .............................. JP2014-142468

(51) Int. Cl.
| | |
|---|---|
| *C23C 18/22* | (2006.01) |
| *C23C 18/30* | (2006.01) |
| *C08J 7/14* | (2006.01) |
| *C25F 1/00* | (2006.01) |
| *C23C 18/24* | (2006.01) |
| *C25D 5/14* | (2006.01) |
| *C23C 18/16* | (2006.01) |
| *C23C 18/20* | (2006.01) |
| *C08J 7/00* | (2006.01) |
| *C08J 7/12* | (2006.01) |
| *C23C 18/38* | (2006.01) |
| *C23C 18/42* | (2006.01) |
| *C23C 18/50* | (2006.01) |
| *C25D 3/38* | (2006.01) |
| *C23C 18/32* | (2006.01) |

(52) U.S. Cl.
CPC ................ *C23C 18/24* (2013.01); *C08J 7/00* (2013.01); *C08J 7/12* (2013.01); *C08J 7/14* (2013.01); *C23C 18/163* (2013.01); *C23C 18/1641* (2013.01); *C23C 18/1675* (2013.01); *C23C 18/2086* (2013.01); *C23C 18/22* (2013.01); *C23C 18/30* (2013.01); *C23C 18/38* (2013.01); *C23C 18/42* (2013.01); *C23C 18/50* (2013.01); *C25D 5/14* (2013.01); *C25F 1/00* (2013.01); *C23C 18/1653* (2013.01); *C23C 18/32* (2013.01); *C25D 3/38* (2013.01)

(58) Field of Classification Search
CPC ..... C23C 18/24; C23C 18/30; C23C 18/1641; C23C 18/32; C23C 18/38; C23C 18/50; C23C 18/42; C23C 18/163; C23C 18/2086; C23C 18/1675; C23C 18/1653; C23C 18/22; C23C 18/26; C25D 5/14; C25D 3/38; C25F 1/00; C09K 13/00; C09K 13/04; C08J 7/00; C08J 7/12; C08J 7/14
See application file for complete search history.

(56) References Cited

U.S. PATENT DOCUMENTS

| | | | |
|---|---|---|---|
| 2,185,858 A | 1/1940 | Mason | |
| 2,875,040 A * | 2/1959 | Barabas | ............... C01G 55/005 423/22 |
| 3,672,875 A * | 6/1972 | MacCragh | .............. C22B 11/06 75/393 |
| 3,891,741 A * | 6/1975 | Carlin | .................... C01G 55/00 203/95 |
| 3,985,794 A * | 10/1976 | Calcagno | ................. B01J 27/06 560/243 |

(Continued)

FOREIGN PATENT DOCUMENTS

| | | |
|---|---|---|
| CN | 1219981 A | 6/1999 |
| CN | 101283120 A | 10/2008 |

(Continued)

OTHER PUBLICATIONS

Ting, "Effect of Manganese Dioxide Dispersion on the Absorbing Properties of Manganese Dioxide (MnO2)-Epoxy Composites", Journal of the Chinese Chemical Society, pp. 1225-1230, vol. 56, No. 6, 2009.
International Search Report dated Jul. 7, 2015, issued in counterpart International Application No. PCT/JP2015/062485 (2 pages).
Supplementary Partial European Search Report dated Jan. 4, 2018, issued in counterpart European Application No. 15819437.3. (16 pages).
Decision of Final Rejection dated Jan. 12, 2018, issued in counterpart Korean Application No. 10-2016-7036295, with English machine translation. (7 pages).
Extended (supplementary) European Search Report dated Mar. 1, 2018, issued in counterpart European Application No. 15819437.3. (14 pages).

(Continued)

*Primary Examiner* — Katherine A Bareford
(74) *Attorney, Agent, or Firm* — Westerman, Hattori, Daniels & Adrian, LLP

(57) ABSTRACT

The present invention provides a resin plating method using an etching bath containing manganese as an active ingredient, the method being capable of maintaining stable etching performance even during continuous use. The resin plating method includes: an etching step, which uses a resin material-containing article as an object to be treated and etches the article using an acidic etching bath containing manganese; a catalyst application step, which uses palladium as a catalyst metal; and an electroless plating step; and the method further includes a step of maintaining the palladium concentration in the acidic etching bath at 100 mg/L or less.

7 Claims, No Drawings

(56) References Cited

U.S. PATENT DOCUMENTS

| | | | | |
|---|---|---|---|---|
| 4,204,013 | A * | 5/1980 | Arcilesi | C23C 18/28 |
| | | | | 106/1.11 |
| 4,448,811 | A * | 5/1984 | Doty | C23C 18/28 |
| | | | | 216/35 |
| 5,019,229 | A * | 5/1991 | Grapentin | C23C 18/22 |
| | | | | 205/781.5 |
| 5,286,530 | A * | 2/1994 | Karas | C23C 18/22 |
| | | | | 427/306 |
| 6,132,938 | A * | 10/2000 | Yoshida | B41C 1/1033 |
| | | | | 101/459 |
| 6,193,789 | B1 | 2/2001 | Honma et al. | |
| 8,603,352 | B1 | 12/2013 | Zhang-Beglinger et al. | |
| 2003/0166796 | A1* | 9/2003 | Imaizumi | C08G 59/50 |
| | | | | 525/534 |
| 2005/0109734 | A1 | 5/2005 | Kuriyama et al. | |
| 2008/0073614 | A1 | 3/2008 | Akiyama et al. | |
| 2009/0092757 | A1 | 4/2009 | Satou et al. | |
| 2010/0155255 | A1* | 6/2010 | Nagao | C23C 18/1653 |
| | | | | 205/184 |
| 2012/0305406 | A1* | 12/2012 | Pereira | C23C 18/30 |
| | | | | 205/164 |
| 2013/0186862 | A1 | 7/2013 | Pearson et al. | |
| 2014/0091052 | A1 | 4/2014 | Nagashima et al. | |
| 2014/0306147 | A1 | 10/2014 | Weitershaus et al. | |
| 2014/0318983 | A1 | 10/2014 | Herdman | |
| 2017/0283979 | A1* | 10/2017 | Yoshikane | C01B 7/096 |

FOREIGN PATENT DOCUMENTS

| | | | | |
|---|---|---|---|---|
| CN | 101892470 | A | | 11/2010 |
| CN | 102105020 | A | | 6/2011 |
| CN | 102791907 | A | | 11/2012 |
| EP | 1 959 029 | A1 | | 8/2008 |
| JP | 2001-59195 | A | | 3/2001 |
| JP | 2001-164373 | | * | 6/2001 |
| JP | 2002-363761 | A | | 12/2002 |
| JP | 2003-013244 | | * | 1/2003 |
| JP | 2003-160876 | A | | 6/2003 |
| JP | 2005-504178 | A | | 2/2005 |
| JP | 2008-31513 | A | | 2/2008 |
| JP | 2008-078251 | | * | 4/2008 |
| JP | 2008-106354 | A | | 5/2008 |
| JP | 2009-30151 | A | | 2/2009 |
| JP | 2009-228083 | A | | 10/2009 |
| JP | 2010-138434 | A | | 6/2010 |
| JP | 4649817 | B2 | | 3/2011 |
| WO | WO-8204072 | A1 * | 11/1982 | ............... C23F 1/30 |
| WO | 03/029518 | A2 | | 4/2003 |
| WO | 2008/143190 | A1 | | 11/2008 |
| WO | 2009/023628 | A2 | | 2/2009 |
| WO | 2011/098428 | A1 | | 8/2011 |
| WO | 2013/030098 | | * | 3/2013 |
| WO | 2013/048635 | A1 | | 4/2013 |
| WO | WO-2013083600 | A2 * | 6/2013 | ............. B82Y 30/00 |
| WO | 2013/112268 | A2 | | 8/2013 |
| WO | 2013/135862 | A2 | | 9/2013 |
| WO | 2013/135863 | A1 | | 9/2013 |
| WO | 2013/163316 | A2 | | 10/2013 |
| WO | 2013/167598 | A2 | | 11/2013 |
| WO | 2013/167598 | A3 | | 11/2013 |
| WO | 2014/077957 | A1 | | 5/2014 |
| WO | 2014/124773 | A2 | | 8/2014 |
| WO | 2013/135864 | A1 | | 9/2016 |
| WO | WO-2016147709 | A1 * | 9/2016 | ............. C23C 18/30 |

OTHER PUBLICATIONS

Office Action dated Sep. 1, 2017, issued in counterpart Korean Application No. 10-2016-7036295, with English translation. (9 pages).

Office Action dated Apr. 26, 2018, issued in counterpart Chinese Application No. 201580036806.9, with English translation. (11 pages).

Office Action dated Aug. 13, 2018, issued in counterpart Korean application No. 10-2018-7004009, with English translation. (8 pages).

Web page http://www.acadsoft.co.uk/scdbase/scdbase.htm; downloaded Apr. 23, 2021; Cited in EP notice of Opposition dated May 4, 2021. (7 pages).

Wang, Guixiang et al., "Effect of Pd ions in the chemical etching solution", Journal of University of Science & Technology 2007; Cited in EP notice of Opposition dated May 4, 2021. (4 pages).

Suchentrunk, Dr. Richard et al., "Kunststoff-Metallisierung", Eugen G. Leuze Verlag, 2007 pp. 60-63, and 85-87, published 2007. Cited in EP notice of Opposition dated May 4, 2021 (11 pages).

Notice of Opposition dated May 4, 2021, issued in counterpart EP patent application No. 15819437.3. (36 pages).

* cited by examiner

RESIN PLATING METHOD

TECHNICAL FIELD

The present invention relates to a resin plating method.

BACKGROUND ART

In recent years, molded resin articles have been used as automobile components to reduce automobile weight, etc. To achieve this object, resins such as ABS resins, PC/ABS resins, PPE resins, and polyamide resins have been used. Molded resin articles are often plated with copper, nickel, or the like to provide a high-quality impression and beautiful appearance. Further, a method of plating a resin substrate with copper or the like is also used as a method for forming a conductor circuit by imparting conductivity to a resin substrate.

A common method for plating a resin material, such as a resin substrate or a molded resin article, comprises the steps of degreasing and etching, optionally followed by neutralization and predipping; and then applying an electroless plating catalyst using a colloidal solution containing a tin compound and a palladium compound, optionally followed by activation (treatment with an accelerator), to perform electroless plating and electroplating sequentially.

In this case, a chromic acid mixture comprising a mixed solution of chromium trioxide and sulfuric acid has been widely used as an etching treatment solution. However, chromic acid mixtures, which contain toxic hexavalent chromium, adversely affect work environments. Furthermore, safe disposal of the liquid waste requires reduction of the hexavalent chromium to a trivalent chromium ion, followed by neutralization and precipitation, thus requiring complicated treatment for the disposal of the liquid waste. Therefore, in consideration of workplace safety during the treatment and adverse effects of the liquid waste on the environment, avoiding the use of chromic acid-containing etching solutions is preferable.

Etching baths containing manganese as an active ingredient are known as etching solutions that can be used in place of chromic acid mixtures. For example, Patent Literature (PTL) 1 listed below discloses an acidic etching bath containing permanganate. Patent Literature 1 teaches that various inorganic and organic acids can be used for adjusting the pH of the etching bath, and that sulfuric acid was used to adjust the pH to 1 or less in the Examples. Patent Literature (PTL) 2 listed below also discloses an etching treatment solution containing permanganate and inorganic acid. Non-patent Literature (NPL) 1 listed below discloses an acidic etching treatment agent using manganese(IV) oxide.

CITATION LIST

Patent Literature

PTL 1: JP2009-228083A
PTL 2: JP2008-31513A

Non-patent Literature (NPL)

Non-patent Literature (NPL) 1: Journal of the Chinese Chemical Society, 2009, 56, 1225-1230

SUMMARY OF INVENTION

Technical Problem

The above-described acidic etching baths containing manganese, which do not contain toxic hexavalent chromium, are advantageous etching solutions in terms of work environment or environmental impact. However, acidic etching baths containing manganese are disadvantageous in that etching power is significantly reduced during continuous use. This is one factor that inhibits the practical application of an acidic etching bath containing manganese. Accordingly, in resin plating methods using an etching bath containing manganese as an active ingredient, a method capable of maintaining stable etching performance even during continuous use has been desired.

Solution to Problem

The present inventors conducted extensive research to achieve the above object. As a result, the inventors found that when a plating treatment is performed by a process comprising an etching step in which a resin material, such as a molded resin article, is used as an object to be treated and is subjected to etching, followed by a catalyst application step and an electroless plating step, palladium used as catalyst metal in the etching bath is gradually accumulated during a long-term continuous plating treatment by repeating the above steps. The inventors further discovered an unexpected phenomenon; specifically, when an etching treatment is performed using an acidic etching bath containing manganese as an active ingredient, etching performance is significantly reduced with an increase of palladium concentration in the bath. As a result, the inventors found that when the palladium concentration in the etching bath is controlled at a specific concentration or lower, good etching performance can be maintained over a long period of time. The present invention has been accomplished based on this finding.

More specifically, the present invention provides the following resin plating methods and methods for controlling the resin plating etching bath.

Item 1. A resin plating method comprising an etching step in which an article comprising a resin material is used as an object to be treated and is subjected to etching using an acidic etching bath containing manganese; a catalyst application step using palladium as a catalyst metal; and an electroless plating step, the method further comprising a step of maintaining the palladium concentration in the acidic etching bath at 100 mg/L or less.

Item 2. The resin plating method according to Item 1, wherein the step of maintaining the palladium concentration in the acidic etching bath at 100 mg/L or less is performed by one or more methods selected from the group consisting of: a method for removing palladium adsorbed on a jig; a method for reducing the palladium concentration in an etching bath by cathodic electrolysis; and a method for reducing the palladium concentration by iodide addition to an etching bath.

Item 3. The resin plating method according to Item 2, wherein the method for removing palladium adsorbed on a jig is a method of immersing a jig in a palladium-removing treatment solution comprising an aqueous solution containing at least one compound selected from the group consisting of nitric acid, persulfates, hydrogen peroxide, and compounds having a stability constant with palladium of 2.0 or more.

Item 4. The resin plating method according to Item 2, wherein the method for reducing the palladium concentration in an etching bath by cathodic electrolysis is a method of depositing palladium in an etching bath on a cathode as metallic palladium by electrolytic treatment.

Item 5. The resin plating method according to Item 2, wherein the method for reducing the palladium concentration by iodide addition to an etching bath is a method comprising adding to an etching bath at least one iodide selected from the group consisting of sodium iodide, potassium iodide, iodic acid, iodates, periodic acid, and periodates, and separating the formed precipitate.

Item 6. A method for controlling a resin plating etching bath, comprising maintaining the palladium concentration in a manganese-containing acidic etching bath at 100 mg/L or less.

Hereinafter, the resin plating method of the present invention is specifically explained.

Resin Plating Method

The resin plating method of the present invention comprises: an etching step in which an article comprising a resin material is used as an object to be treated and is subjected to an etching treatment using an acidic etching bath containing manganese; a catalyst application step using palladium as a catalyst metal; and an electroless plating step. This method is described below in detail. Washing with water is usually performed between each treatment step.

(1) Object to be Treated

The object to be treated by the resin plating method of the present invention is an article comprising a resin material as a component. For example, molded articles comprising a resin material; and articles, such as printed circuit boards, including a portion comprising a resin material, can be used as objects to be treated.

The kind of resin material used as an object to be treated is not particularly limited. In particular, a good electroless plating film can be formed on various resin materials that have been etched using a chromic acid-sulfuric acid mixture. For example, the following resin materials can be used as objects to be treated to form a good electroless plating film: styrene-based resins such as acrylonitrile-butadiene-styrene copolymer resins (ABS resins); resins (AAS resins) having an acrylic rubber component in place of a butadiene rubber component of ABS resin; and resins (AES resins) having an ethylene-propylene rubber component or the like in place of a butadiene rubber component of ABS resin. Examples of resin materials preferably used further include alloy resins of the styrene-based resins mentioned above and polycarbonate (PC) resins (for example, alloy resins containing a PC resin in a proportion of about 30 to about 70 wt. %). It is also possible to use polyphenylene ether resins, polyphenylene oxide resins, and like resins that have excellent heat resistance and physical properties.

There is no specific limitation on the shape, size, etc., of the object to be treated. A good plating film with excellent appearance, physical properties, etc., can be formed even on large objects having a large surface area. Examples of such large resin products include automobile parts and accessories, such as radiator grills, hubcaps, medium or small emblems, and door handles; exterior equipment used in the electrical or electronic field; faucet fittings used in places where water is supplied; game machine-related products, such as pachinko components; and the like.

(2) Etching Step

The etching bath using the resin plating method of the present invention comprises an acidic aqueous solution containing manganese as an active ingredient.

Manganese contained in the etching bath may be trivalent, tetravalent, or heptavalent. For example, manganese may be present in the etching bath in the form of manganese ions such as trivalent manganese ions or tetravalent manganese ions, or as heptavalent manganese in the form of permanganic acid ions.

The manganese concentration in the etching bath is not particularly limited. For example, the etching bath having a manganese concentration of about 0.01 to 100 g/L can be used for the treatment.

The etching bath comprises an acidic aqueous solution containing an acid component. Examples of acid components contained in the etching bath include inorganic acids, such as sulfuric acid, phosphoric acid, nitric acid, and hydrochloric acid; organic sulfonic acids, such as methanesulfonic acid and ethanesulfonic acid; and the like.

The acid component concentration in the etching bath is not particularly limited, and may be, for example, about 100 to 1800 g/L.

The etching bath may further contain various additives. Examples of such additives include surfactants. The kind of surfactant is not particularly limited as long as the surface tension of the etching solution can be reduced. In particular, examples of surfactants relatively stable in an oxidizing atmosphere include anionic surfactants, such as alkylbenzenesulfonic acid, perfluorooctanoate, and perfluoroheptanoate.

The etching conditions are not particularly limited, and can be suitably selected according to the type of etching bath used, kind of resin material to be treated, the desired degree of etching, etc. For example, etching may be performed by immersing an object to be treated in an etching bath at an etching solution temperature of about 30 to 70° C. for about 3 to 30 minutes.

When the surface of the resin molded article, which is an object to be treated, is extremely dirty, the surface may, if necessary, be degreased according to a usual method prior to etching.

(3) Catalyst Application Step

After the resin material is etched by the above method, an electroless plating catalyst is applied.

In the catalyst application step of the resin plating method of the present invention, a catalyst application solution containing palladium is used as a catalyst metal. Examples of representative methods for applying a palladium catalyst include the so-called sensitizing-activating method, catalyzing method, and the like.

Among these methods, the sensitizing-activating method comprises sensitizing a substrate using an aqueous solution containing stannous chloride and hydrochloric acid, and then activating its surface by using an aqueous solution containing a palladium salt, such as palladium chloride.

The catalyzing method can be roughly classified into acid-catalyzing methods and alkali-catalyzing methods. The acid-catalyzing method comprises catalyzing a substrate with an acidic colloidal solution containing palladium chloride and stannous chloride, and then activating its surface by using an aqueous sulfuric acid solution, an aqueous hydrochloric acid solution, or the like. The alkali-catalyzing method comprises catalyzing a substrate to be plated with an alkaline solution containing palladium chloride and an amine compound, and then reducing its surface using dimethylamine borane or hypophosphite.

Specific treatment methods, treatment conditions, etc. of these methods may be according to known methods.

If necessary, in order to remove manganese that has adhered to the surface of the object to be treated as a result of etching, post-etching treatment may be performed using an inorganic acid, such as sulfuric acid or hydrochloric acid, or a reducing agent, such as erythorbic acid or hydrogen peroxide, prior to the catalyst application step.

(4) Plating Step

After a catalyst is applied by the above method, electroless plating treatment is performed. The electroless plating solution may be any known autocatalytic electroless plating solution. Examples of such electroless plating solutions include electroless nickel plating solutions, electroless copper plating solutions, electroless cobalt plating solutions, electroless copper-nickel alloy plating solutions, electroless nickel-cobalt alloy plating solutions, electroless gold plating solutions, and the like.

The electroless plating conditions may also be according to known methods. If necessary, two or more layers of electroless plating film may be formed.

After the electroless plating, electroplating may be performed. In this case, after the electroless plating, an activation treatment may be optionally performed using an aqueous solution of an acid, alkali, or the like, after which electroplating may be performed. The kind of electroplating solution is not particularly limited. The electroplating solution can be suitably selected from known electroplating solutions according to the purpose.

The resin plating method according to the present invention comprises the above-mentioned etching step, catalyst application step, and plating step. If necessary, the method may further comprise other various treatment steps. Examples of such treatment steps include a swelling treatment before etching (pre-etching), rack protection treatment for preventing the deposition on a jig, and like treatment steps.

Step of Maintaining the Palladium Concentration at 100 mg/L or Less

According to the resin plating method of the present invention comprising an etching step using an acidic etching bath containing manganese, a catalyst application step using palladium as a catalyst metal, and an electroless plating step, when a plating treatment is continuously performed by repeating these steps, it is necessary to maintain the palladium concentration in the manganese-containing acidic etching bath at 100 mg/L or less.

The present inventors' research found that that when a plating treatment is repeatedly performed on a resin material by the above method, palladium contained in the catalyst application solution used in the catalyst application step, which is a step performed after the etching treatment, is gradually accumulated in the etching bath. The present inventors discovered a conventionally unknown phenomenon that when the palladium concentration contained in the etching bath exceeds 100 mg/L, the etching performance is significantly reduced.

Accordingly, when an article comprising a resin material is subjected to a plating treatment by the plating method of the present invention comprising an etching treatment step using an acidic etching bath containing manganese, a catalyst application step using palladium as a catalyst metal, and an electroless plating step, it is necessary to control and maintain the palladium concentration in the etching bath at 100 mg/L or less. It is particularly preferable that the palladium concentration in the etching bath be maintained at about 50 mg/L or less, and more preferably at about 20 mg/L or less.

The method for maintaining the palladium concentration at 100 mg/L or less is not particularly limited. For example, the entire etching bath or a portion thereof may be replenished to maintain the palladium concentration at 100 mg/L or less. However, in view of cost efficiency, for example, a method for removing palladium adsorbed on a jig, a method for reducing the palladium concentration in an etching bath by cathodic electrolysis, or a method for reducing the palladium concentration by iodide addition to an etching bath is preferably used. These methods may be performed singly, or in a combination of two or more. Using these methods in combination can more efficiently reduce the palladium concentration. These treatments do not have to be performed every time in the resin plating method comprising the above steps, but may be appropriately performed according to the degree of accumulation of palladium in the etching bath.

These methods are described below more specifically.

(i) Method for Removing Palladium Adsorbed on Jig

The present inventors' research revealed that the main factor that causes palladium accumulation in an etching bath is the desorption, in the etching bath, of palladium that has been adsorbed on the jig used in a plating treatment. Accordingly, the resin plating method of the present invention comprises a step of removing palladium adsorbed on a jig to suppress accumulation of palladium in an etching bath, thus maintaining the palladium concentration in an etching bath at 100 mg/L or less.

The method for removing palladium adsorbed on a jig is not particularly limited. For example, the method for removing palladium adsorbed on a jig may be a method of immersing a jig in a palladium-removing treatment solution comprising an aqueous solution containing at least one compound selected from the group consisting of nitric acid, persulfates, hydrogen peroxide, and compounds having a stability constant with palladium of 2.0 or more (hereinafter sometimes referred to as "the palladium-removing compound").

Among the palladium-removing compounds, specific examples of persulfates include sodium persulfate, ammonium persulfate, potassium persulfate, and the like. Examples of compounds having a stability constant with palladium of 2.0 or more include ethylenediamine, thiourea, acetylacetone, and like various compounds; and dimethylglyoxime, cyclohexanone oxime, benzophenone oxime, diphenylmethanone oxime, and like oxime compounds.

The concentration of the palladium-removing compound in the palladium-removing treatment solution is not particularly limited. However, an excessively low concentration of the palladium-removing compound may result in an insufficient palladium removal effect. Although the concentration of the palladium-removing compound may vary depending on its solubility, an excessively high concentration of the palladium-removing compound is disadvantageous in terms of cost. Accordingly, the concentration of the palladium-removing compound in the palladium-removing treatment solution is preferably about 0.01 to 1000 g/L, more preferably about 0.1 to 500 g/L, and even more preferably about 1 to 100 g/L.

The liquid temperature of the palladium-removing treatment solution is not particularly limited. An excessively low liquid temperature may result in an insufficient palladium removal effect. An excessively high liquid temperature tends to deteriorate the jig. Accordingly, the liquid temperature of the palladium-removing treatment solution is preferably about 10 to 70° C., and more preferably about 20 to 50° C.

Although the time of immersing a jig in the palladium-removing treatment solution is not particularly limited, an excessively short immersion time may result in an insufficient palladium removal effect. An excessively long immersion time is disadvantageous in terms of productivity on an industrial scale. Accordingly, the immersion time in the palladium-removing treatment solution is preferably about 1 second to about 5 hours, more preferably about 10 seconds to about 2 hours, and even more preferably about 1 minute to about 1 hour.

The treatment for removing palladium can be performed at any stage after the electroless plating treatment or before the etching treatment. In particular, if the treatment for removing palladium is performed after the object to be treated has been removed from the jig after electroplating, the treatment may also function as a step of dissolving and stripping a plating film deposited on the contact point of a jig (so-called "jig cleaning"); however, this may depend on the composition of the palladium-removing treatment solution. For example, if a jig from which after an electroplating treatment, the object to be treated has been removed is immersed in nitric acid, the plating film deposited on the contact point of the jig may be dissolved and stripped while removing palladium adsorbed on the jig, thus achieving an efficient treatment.

(ii) Method for Reducing the Palladium Concentration by Cathodic Electrolysis

The palladium accumulated in the etching bath can be removed, for example, by electrolytic treatment to deposit palladium in an etching bath on a cathode as metallic palladium.

The electrolytic treatment conditions are not particularly limited, and can be suitably determined according to the composition of the etching bath and the amount of palladium accumulated. To efficiently remove palladium, for example, the cathode current density may be, for example, about 50 A/dm or less, preferably about 40 A/dm$^2$ or less, and more preferably about 30 A/dm$^2$ or less. The lower limit of the cathode current density is not particularly limited. In view of treatment efficiency, it is usually preferable that the cathode current density be about 0.1 A/dm$^2$ or more, and more preferably about 0.5 A/dm$^2$ or more.

The liquid temperature of the etching bath during the electrolytic treatment is not particularly limited. An excessively low liquid temperature may result in insufficient palladium removal efficiency. An excessively high liquid temperature increases the burden on equipment such as electrodes. Accordingly, for example, the liquid temperature of the etching bath during the electrolytic treatment is preferably about 30 to 80° C., and more preferably about 50 to 70° C.

Any electrode material exhibiting durability and sufficient electrical conductivity in an acidic solution may be used as the anode in the electrolytic treatment. Examples of usable electrode materials include Pt/Ti, carbon, SUS, Pt, Pb, PbO$_2$, Ta, Zr, Fe—Si, diamond, and the like.

As with the anode, any electrode material exhibiting durability and sufficient electrical conductivity in an acidic solution may be used as the cathode. Examples of usable electrode materials include Pt/Ti, carbon, SUS, Pt, Pb, PbO$_2$, Ta, Zr, Fe—Si, diamond, and the like.

The electrolysis may be performed until the palladium concentration in the etching bath becomes less than or equal to the target concentration.

(iii) Method for Reducing the Palladium Concentration by Iodide Addition

Adding an iodide to a palladium-accumulated etching bath can form a precipitate of insoluble palladium iodide. Separating this precipitate by a method such as filtration can remove palladium from the etching bath.

Examples of iodides added to remove palladium include sodium iodide, potassium iodide, iodic acid, iodates (e.g., sodium iodate, potassium iodate, and ammonium iodate), periodic acid, periodates (e.g., sodium periodate, potassium periodate, and ammonium iodate), and the like. Such iodides can be used singly, or in a combination of two or more.

Although the amount of iodide added is not particularly limited, an excessively low amount of iodide may result in an insufficient palladium removal effect, whereas a large excess of iodide does not provide cost-effective effects. Accordingly, the concentration of the iodide added to the etching bath is preferably 2 to 100 times, more preferably about 5 to 50 times, the concentration of the palladium concentration in the bath in terms of molar ratio.

The liquid temperature during the treatment for removing palladium is not particularly limited. However, an excessively low temperature may result in an insufficient palladium removal effect, whereas an excessively high liquid temperature tends to deteriorate the jig. Accordingly, the liquid temperature is preferably, for example, about 30 to 80° C., and more preferably about 50 to 70° C.

To efficiently form the precipitate of palladium iodide, the etching bath is preferably stirred after adding an iodide to the etching bath. Although the stirring time is not particularly limited, an excessively short stirring time may result in an incomplete palladium iodide production reaction and fail to obtain a sufficient effect. On the other hand, an excessively long stirring time is disadvantageous in terms of productivity on an industrial scale. Accordingly, the stirring time after iodide addition is preferably about 1 minute to about 2 hours, and more preferably about 10 minutes to about 1 hour.

Advantageous Effects of Invention

According to the resin plating method of the present invention, even if an acidic etching bath containing manganese as an active ingredient is used continuously, excellent etching performance can be maintained for a long period of time while inhibiting the reduction of etching power.

Therefore, according to the resin plating method of the present invention, a good plating film can be continuously formed for a long period of time on articles comprising various resin materials, which are used as objects to be plated.

DESCRIPTION OF EMBODIMENTS

The present invention is described below in more detail with reference to Examples.

Examples 1 to 7 and Comparative Examples 1 to 7

Flat plates (10 cm×5 cm×0.3 cm, surface area: about 1 dm$^2$) of ABS resin (produced by UMG ABS, Ltd., trade name: UMG ABS3001M) were used as test pieces and attached to a jig coated with vinyl chloride. The test pieces were plated by the steps shown in Table 1 below. The volumes of treatment solutions used in the treatments were all set to 1 L, and the test pieces were washed with water between each treatment.

TABLE 1

| Treatment step | Type of treatment solution | Treatment conditions |
|---|---|---|
| Degreasing treatment | Alkaline degreasing solution (produced by Okuno Chemical Industries Co., Ltd., ACE CLEAN A-220 bath) | 40° C., immersion time: 5 min. |
| Etching treatment | Etching bath shown in Table 2 below | 68° C., immersion time: 20 min. |
| Acid pickling | 300 ml/L sulfuric acid | 25° C., immersion time: 1 min. |
| Catalyst application | Palladium-tin colloidal catalyst solution (produced by Okuno Chemical Industries Co., Ltd., catalyst C bath) | 40° C., immersion time: 5 min. |
| Activation | Aqueous solution containing 100 ml/L of 35% hydrochloric acid | 35° C., immersion time: 5 min. |
| Electroless nickel Plating | Electroless nickel plating solution (produced by Okuno Chemical Industries Co., Ltd., Chemical Nickel SEP-LF bath) | 40° C., immersion time: 5 min. |
| Copper sulfate plating | Copper sulfate plating solution (produced by Okuno Chemical Industries Co., Ltd., Top Lucina 2000 bath) | Cathode current density: 3 A, 25° C., plating time: 30 min. |
| Semi-bright nickel plating | Semi-bright nickel plating solution (produced by Okuno Chemical Industries Co., Ltd., ACNA NEO bath) | Cathode current density: 3 A 55° C., plating time: 20 min. |
| Bright nickel plating | Bright nickel plating solution (produced by Okuno Chemical Industries Co., Ltd., (KAI) ACNA B bath) | Cathode current density: 3 A, 55° C., plating time: 15 min. |
| Trivalent chrome Plating | Trivalent chromium plating solution (produced by Okuno Chemical Industries Co., Ltd., Top Fine chromium WR bath) | Cathode current density: 10 A, 35° C., plating time: 4 min. |

Table 2 to 5 below show the compositions of the etching baths used in the plating steps above.

In the resin plating method comprising the treatment steps described above, the treatment for removing Pd from a jig, the treatment for removing Pd by cathodic electrolysis and/or the treatment for removing Pd by iodide addition were performed under the conditions shown in Tables 2 to 5 below.

Among these treatments, the treatment for removing Pd from a jig was performed every time after each test piece plated with trivalent chrome was removed from the jig. The treatment for removing Pd by cathodic electrolysis and the treatment for removing Pd by iodine addition were performed in the etching bath used every 100 times of the resin plating treatment comprising the above treatment steps.

Using the test pieces obtained in the Examples, the palladium concentration in the etching bath after treating 1000 test pieces (treatment area: 1000 dm$^2$/L) and the peel strength of the obtained plating film were measured. The palladium concentration in the bath was measured by the ICP method. The peel strength was determined in the following manner. The test pieces plated by the above steps were dried at 80° C. for 120 minutes, and allowed to stand to cool to room temperature. Thereafter, parallel cuts with a width of 10 mm were made in the plating film, and the plating film was pulled in a direction vertical to the resin surface using a tensile tester (Autograph AGS-J 1 kN; produced by Shimadzu Corporation) to determine the peel strength. Tables 2 to 5 below show the results.

Resin plating was performed in the same manner as in the Examples except that none of the treatment for removing Pd from a jig, the treatment for removing Pd by cathodic electrolysis, and the treatment for removing Pd by iodide addition was performed. These results are shown as Comparative Examples in Tables 2 to 5.

TABLE 2

| | | Comp. Ex. 1 | Example 1 | Comp. Ex. 2 | Example 2 |
|---|---|---|---|---|---|
| Composition of the etching bath | | 10 g/L manganese(III) phosphate + 1200 g/L sulfuric acid | | 4 g/L manganese(IV) oxide + 900 g/L phosphoric acid | |
| Treatment for removing Pd from the jig | Composition | — | 300 g/L nitric acid | — | — |
| | Temperature (° C.) | | 25 | | |
| | Time (min.) | | 30 | | |
| Treatment for removing Pd in the etching bath by cathodic electrolysis | Anode | — | — | — | Pt/Ti |
| | Cathode | | | | Zr |
| | Cathode current density (A/dm$^2$) | | | | 20 |
| | Temperature (° C.) | | | | 70 |
| | Time (min.) | | | | 60 |
| Treatment for removing Pd in the etching bath by iodide addition | Iodide salt | — | — | — | — |
| | Amount added (mg/L) | | | | |
| | Temperature (° C.) | | | | |
| | Time (min.) | | | | |

TABLE 2-continued

|  |  | Comp. Ex. 1 | Example 1 | Comp. Ex. 2 | Example 2 |
| --- | --- | --- | --- | --- | --- |
| Pd concentration (mg/L) in the bath after treating 1000 test pieces |  | 120 | 30 | 114 | 55 |
| Peel strength | Immediately after preparing the bath | 0.61 | 0.61 | 0.57 | 0.57 |
|  | 1000 dm²/L | 0.11 | 0.58 | 0.09 | 0.51 |

TABLE 3

|  |  | Comp. Ex. 3 | Example 3 | Comp. Ex. 4 | Example 4 |
| --- | --- | --- | --- | --- | --- |
| Composition of the etching bath |  | 3 g/L potassium permanganate(VII) + 700 g/L sulfuric acid + 700 g/L phosphoric acid | | 2 g/L manganese(III) fluoride + 5 g/L sodium permanganate(VII) + 700 g/L sulfuric acid + 600 g/L phosphoric acid | |
| Treatment for removing Pd from the jig | Composition | — | — | — | 300 g/L nitric acid + 20 g/L ethylene diamine |
|  | Temperature (° C.) |  |  |  | 25 |
|  | Time (min.) |  |  |  | 60 |
| Treatment for removing Pd in the etching bath by cathodic electrolysis | Anode | — | — | — | Pb |
|  | Cathode |  |  |  | Zr |
|  | Cathode current density (A/dm²) |  |  |  | 30 |
|  | Temperature (° C.) |  |  |  | 70 |
|  | Time (min.) |  |  |  | 30 |
| Treatment for removing Pd in the etching bath by iodide addition | Iodide salt | — | KI | — | — |
|  | Amount added (mg/L) |  | 200 |  |  |
|  | Temperature (° C.) |  | 70 |  |  |
|  | Time (min.) |  | 30 |  |  |
| Pd concentration (mg/L) in the bath after treating 1000 test pieces |  | 150 | 20 | 190 | 15 |
| Peel strength | Immediately after preparing the bath | 0.96 | 0.96 | 0.89 | 0.89 |
|  | 1000 dm²/L | 0.19 | 0.94 | 0.21 | 0.85 |

TABLE 4

|  |  | Comp. Ex. 5 | Example 5 | Comp. Ex. 6 | Example 6 |
| --- | --- | --- | --- | --- | --- |
| Composition of the etching bath |  | 5 g/L manganese(IV) oxide + 10 g/L sodium permanganate(VII) + 1000 g/L methanesulfonic acid | | 5 g/L manganese(IV) oxide + 10 g/L sodium permanganate(VII) + 700 g/L sulfuric acid + 700 g/L methanesulfonic acid | |
| Treatment for removing Pd from the jig | Composition | — | — | — | 200 g/L hydrogen peroxide + 10 g/L thiourea |
|  | Temperature (° C.) |  |  |  | 40 |
|  | Time (min.) |  |  |  | 90 |
| Treatment for removing Pd in the etching bath by cathodic electrolysis | Anode | — | Pb | — | — |
|  | Cathode |  | Pt/Ti |  |  |
|  | Cathode current density (A/dm²) |  | 15 |  |  |
|  | Temperature (° C.) |  | 70 |  |  |
|  | Time (min.) |  | 90 |  |  |
| Treatment for removing Pd in the etching bath by iodide addition | Iodide salt | — | NaI | — | Sodium iodate |
|  | Amount added (mg/L) |  | 200 |  | 100 |
|  | Temperature (° C.) |  | 70 |  | 70 |
|  | Time (min.) |  | 20 |  | 10 |
| Pd concentration (mg/L) in the bath after treating 1000 test pieces |  | 185 | 5 | 210 | 8 |
| Peel strength | Immediately after preparing the bath | 0.91 | 0.91 | 0.99 | 0.99 |
|  | 1000 dm²/L | 0.18 | 0.88 | 0.12 | 0.94 |

TABLE 5

| | | Comp. Ex. 7 | Example 7 |
|---|---|---|---|
| Composition of the etching bath | | 10 g/L manganese(III) acetate + 4 g/L manganese(IV) oxide + 15 g/L potassium permanganate(VII) + 700 g/L sulfuric acid + 700 g/L methanesulfonic acid | |
| Treatment for removing Pd from the jig | Composition | — | 300 g/L nitric acid + 20 g/L dimethylglyoxime |
| | Temperature (° C.) | | 30 |
| | Time (min.) | | 60 |
| Treatment for removing Pd in the etching bath by cathodic electrolysis | Anode | — | Carbon |
| | Cathode | | Pt/Ti |
| | Cathode current density (A/dm²) | | 10 |
| | Temperature (° C.) | | 70 |
| | Time (min.) | | 60 |
| Treatment for removing Pd in the etching bath by iodide addition | Iodide salt | — | Potassium periodate |
| | Amount added (mg/L) | | 150 |
| | Temperature (° C.) | | 70 |
| | Time (min.) | | 15 |
| Pd concentration (mg/L) in the bath after treating 1000 test pieces | | 205 | 0.2 |
| Peel strength | Immediately after preparing the bath | 1.02 | 1.02 |
| | 1000 dm²/L | 0.13 | 1.02 |

The above results clearly confirm that when the palladium concentration in the etching bath was maintained at 100 mg/L or less (Examples 1 to 7) by any one of the treatment for removing Pd from a jig, the treatment for removing Pd in an etching bath by cathodic electrolysis, and the treatment for removing Pd from an etching bath by iodide addition, substantially no reduction in peel strength occurred, and good etching power could be maintained even after treating 1000 test pieces (treatment area: 1000 dm²/L). In particular, when two or more of the above treatments were performed in combination (Examples 5 to 7), the palladium concentration in the etching bath could be maintained at a lower level, and good etching performance was exhibited.

In contrast, when no treatment for reducing the Pd concentration was performed (Comparative Examples 1 to 7), the palladium concentration in the bath was increased to 114 to 210 mg/L after treating 1000 test pieces; etching power was reduced, compared with that immediately after preparing the bath; and significant reduction in peel strength of the obtained plating film was observed.

These results clearly show that controlling the metal palladium concentration in an acidic etching bath containing manganese as an active ingredient at 100 mg/L or less can maintain good etching power over a long period of time.

The invention claimed is:

1. A resin plating method comprising:
    an etching step,
    a catalyst application step,
    an electroless plating step, and
    a maintaining palladium concentration step;
    wherein an object to be treated by the resin plating method is an article comprising a resin,
    wherein in the etching step, the object to be treated is subjected to etching using an acidic etching bath containing manganese and one or more acid components;
    wherein the acid components comprise at least one selected from the group consisting of sulfuric acid, nitric acid, hydrochloric acid, and organic sulfonic acid;
    wherein in the catalyst application step, a catalyst metal is palladium; and
    wherein the maintaining palladium concentration step maintains a concentration of palladium of up to 100 mg/L in the acidic etching bath;
    wherein the maintaining palladium concentration step is performed by one or more methods selected from the group consisting of:
    a method for reducing the palladium concentration in the acidic etching bath by cathodic electrolysis; wherein the cathodic electrolysis comprises electrolytic treatment by depositing palladium on a cathode in the etching bath; wherein the electrolytic treatment has a cathode current density of 0.1A/dm² to 50A/dm², and wherein, during the electrolytic treatment, the acidic etching bath comprises an etching solution having a solution temperature of 30° C. to 80° C.; and
    a method for reducing the palladium concentration by iodide addition to the acidic etching bath; wherein the iodide addition comprises adding to the etching bath at least one iodide selected from the group consisting of sodium iodide, iodic acid, iodates, periodic acid, and periodates, and then separating formed precipitate; and
    wherein a jig is a holder for the object to be treated.

2. The resin plating method according to claim 1, wherein the etching step, the catalyst application step and the electroless plating step are repeated at least two times or more upon the jig,
    wherein each repeat set of steps is upon a subsequent object to be treated, and
    wherein the maintaining palladium concentration step maintains the concentration of palladium throughout the entire resin plating method.

3. The resin plating method according to claim 1, wherein the concentration of palladium is up to 50 mg/L.

4. The resin plating method according to claim 1, wherein the concentration of palladium is up to 20 mg/L.

5. The resin plating method according to claim 1, wherein manganese in the etching bath is at a concentration of 0.01 to 100 g/L.

6. The resin plating method according to claim 1, further comprising a post-etching treatment,
    wherein the post-etching treatment is performed after the etching step but prior to the catalyst application step; and
    wherein, during the post-etching treatment, manganese is removed by using an inorganic acid or a reducing agent.

7. A method for controlling a resin plating etching bath, comprising maintaining palladium concentration in a manganese-containing acidic etching bath at up to 100 mg/L;
    wherein the manganese-containing acidic etching bath comprises at least one acid component selected from the group consisting of sulfuric acid, nitric acid, hydrochloric acid, and organic sulfonic acid; and
    wherein the maintaining palladium concentration is performed by one or more methods selected from the group consisting of:
    a method for reducing the palladium concentration in the acidic etching bath by cathodic electrolysis; wherein the cathodic electrolysis comprises electrolytic treatment by depositing palladium on a cathode in the etching bath; wherein the electrolytic treatment has a cathode current density of 0.1A/dm² to 50A/dm², and wherein, during the electrolytic treatment, the acidic etching bath comprises an etching solution having a solution temperature of 30° C. to 80° C.; and a method for reducing the palladium concentration by iodide addition to the acidic etching bath; wherein the iodide addition comprises adding to the etching bath at least one iodide selected from the group consisting of sodium iodide, iodic acid, iodates, periodic acid, and periodates, and then separating formed precipitate; and wherein a jig is a holder for an object to be treated.

* * * * *